Figure 1:
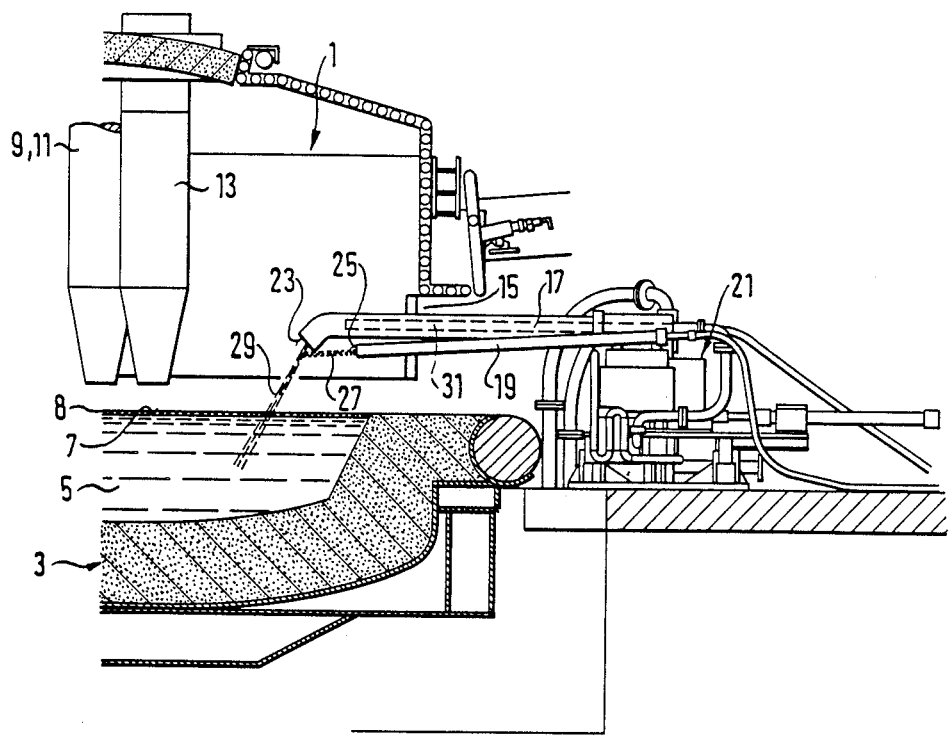

United States Patent [19]

Knapp et al.

[11] Patent Number: 4,986,847
[45] Date of Patent: Jan. 22, 1991

[54] PROCESS AND APPARATUS FOR AT LEAST TEMPORARILY SIMULTANEOUSLY SUBJECTING A MOLTEN METAL TO THE ACTION OF A GAS AND FINE-GRAIN SOLID MATERIALS

[75] Inventors: Hubert Knapp, Bühl; Peter Hoffmann, Schwelm, both of Fed. Rep. of Germany

[73] Assignees: Fuchs Systemtechnik GmbH, Willstatt-Legelshurst; GFI Gesellschaft für Industrieausrüstung mbH, Schwelm, both of Fed. Rep. of Germany

[21] Appl. No.: 440,517

[22] Filed: Nov. 22, 1989

[30] Foreign Application Priority Data

Sep. 20, 1989 [DE] Fed. Rep. of Germany ....... 3931392

[51] Int. Cl.$^5$ .............................................. C21C 7/00
[52] U.S. Cl. ........................................ 75/525; 75/527
[58] Field of Search ..................... 75/53, 58, 51.1, 525, 75/527

[56] References Cited

U.S. PATENT DOCUMENTS

| | | | |
|---|---|---|---|
| 3,260,591 | 7/1966 | Brown | 75/53 |
| 3,331,680 | 7/1967 | Leupold | 75/53 |
| 3,393,997 | 7/1968 | Faste | 75/51.1 |
| 3,406,027 | 10/1968 | Bonilla | 75/53 |
| 3,681,049 | 8/1972 | Celada | 75/10.58 |
| 4,541,866 | 9/1985 | Meyer | 75/58 |

*Primary Examiner*—Peter D. Rosenberg

[57] ABSTRACT

In a process for at least temporarily simultaneously subjecting a molten metal (5) in a metallurgical vessel (3) to the action of a gas and fine-grain solid materials, with a water-cooled first lance (17) for supplying the gas, in accordance with the invention the solid materials are supplied in the form of a conveyor stream (27) by way of a second lance (19). The solid materials are supplied in such a way that, after leaving the outlet opening (25) of the second lance (19), they are deflected by the gas (29) issuing from the outlet opening (23) of the first lance (17) and are supplied with said gas to the molten metal (5).

20 Claims, 2 Drawing Sheets

PROCESS AND APPARATUS FOR AT LEAST TEMPORARILY SIMULTANEOUSLY SUBJECTING A MOLTEN METAL TO THE ACTION OF A GAS AND FINE-GRAIN SOLID MATERIALS

The invention relates to a process for subjecting a molten metal in a metallurgical vessel to the action of a gas and fine-grain solid materials, with a water-cooled first lance for supplying the gas, and an apparatus for carrying out the process.

It is known for example for a molten to be supplied by way of a water-cooled first lance with oxygen of the combustion of carbon or carbon-bearing compounds. Such a lance may be introduced into the vessel as required manually or by way of a controllable manipulator and may be arranged or moved within the vessel in a predeterminable fashion. It is also known for a molten metal to be subjected to the action for example of fine-grain carbon, for example for caburisation purposes or for supplying energy or for promoting the formation of a slag above the molten metal. In addition, to promote the formation of a granulated or foam slag, it is known for a molten metal to be subjected to the action of fine-grain solid materials such as for example lime, dolomite or bauxite or the like, as a slag-forming agent. In the known process the solid materials are supplied for example by way of an opening in the cover of the vessel or by way of a charging door, by pneumatic conveying means. That mode of operation suffers from the disadvantage that only a part of the solid materials supplied passes into the region of the molten metal or the layer of slag which is formed thereupon. On the one hand that results in a high levl of consumption of solid materials while on the other hand it means that the effect which is sought to be achieved by virtue of using the solid materials is only incompletely attained or is attained only with a delay. In addition the combustion of volatile constituents of the fine-grain solid materials supplied can result in gas being undesirably produced in the vessel, which in turn can mean that solid materials supplied leave the vessel together with gas, without passing into the region of the molten metal. An undesirable consequence of that, besides the wastage of energy, is for example the fact that a dust-removal or filter installation which is aranged downstream of the vessel is also additionally burdened.

It is also known (German published specification (DE-AS) No. 25 20 883) for coal dust and oxygen to be introduced into the molten metal by way of nozzles. The nozzles are fixedly disposed in the vessel. That means that, while the process is being carried out, oxygen and coal dust cannot be specifically supplied to given regions of the molten metal. For safely reasons the through-put capacity of nozzles which are arranged in the bottom of the vessel is restricted and the formation of slag can be influenced only to a limited degree by way of nozzles of that kind.

The object of the invention is to provide a process in which a predeterminable surface region of a molten metal can be subjected to the action of gas and fine-grain solid materials in a specific fashion and substantially without a delay, without a part of the solid materials, while same are being supplied, being lost by drifting away into regions of the vessel which are remote from the molten metal.

Another object of the invention is that of providing an apparatus for carrying out that process.

In terms of the process, in accordance with the invention, that object is attained in that, in a process of the specified kind, the solid materials are supplied in the form of a conveyor stream by way of a second lance in such a way that, after leaving the outlet opening of the second lance, they are deflected by gas issuing from the outlet opening of the first lance, and are supplied with said gas to the molten metal.

The use of a second lance for supplying the solid materials in the form of a conveyor stream means that they can be fed to the molten metal in a specific and deliberate fashion and without substantial proportions of the solid materials supplied being lost to the surroundings within the vessel. The molten metal is subjected to the action of the gas and the solid materials in a specific and controlled manner, for example in a limited local area and with a depth of penetration into the molten metal, by virtue of the fact that, after issuing from the second lance, the conveyor stream is deflected by the gas and fed with same to the molten metal. The supply of solid materials together with the gas also provides that gases and solid materials are already mixed while the molten metal is being subjected to the action thereof, which facilitates the occurence of the chemical reactions between the gas and the solid materials or with the molten metal or the layer of slag.

It has been found advantageous in that respect for the gas to issue from the first lance at a speed which is in the supersonic range. In that connection it is particularly advantageous for the gas to issue at about 2.5 times the speed of sound. Solid materials which are to be supplied in that respect are particularly well transported along with the gas and are also carried for example through a layer of slag formed on the molten metal, to the surface of the molten metal or into a region within the molten metal. It is possible in that way to achieve for example a depth of penetration of about 5 cm to 8 cm.

The stream of solid material which may include for example air or an inert gas as the transporting medium advantageously issues from the outlet opening of the second lance at a speed of 20 m/s to 50 m/s. The solid materials are then entrained in the direction of the gas by the transporting medium. Without being fed to the molten metal, the gas can escape into a region of the vessels which is above the molten metal so that it does not have an influence on the occurrence of the chemical reactions in the region of the molten metal.

Oxygen is supplied as the gas, for refining a molten metal.

Depending on the desired effect, fine-grain carbon or fine-grain slag-forming agents such as lime, limestone, bauxite, dolomite and/or metallurgical agents for treating the molten metal may be supplied as the solid materials.

It has been found advantageous for the solid materials to be blast furnace dusts, such as for example untreated filter dusts and/or scale or unreduced ores or the sintered products thereof. Such dusts occur for example in the production and metallurgical treatment of iron, steel and other metals in large amounts and usually have to be removed in expensive and cost-intensive procedures, for example after they have first been pelletised. The process according to the invention means that such dusts can be used again in metallurgical treatments in a simple fashion.

For the purposes of carrying out the process, it has been found to be particularly advantageous for the solid materials to be of a grain size of from about 0.01 mm to 1 mm.

For carrying out the process it has also been found advantageous that a further gas and/or further fine-grain solid materials can be supplied by way of a third lance. In that connection it has been found to be particularly advantageous that a gas flow or a conveyor stream can issue from the third lance substantially unaffected by the gas issuing from the first lance and the conveyor stream issuing from the second lance.

It has also been found to be particularly advantageous that oxygen can be supplied by way of the third lance substantially to a region directly above the surface of the bath of molten metal and within a layer of slag disposed thereabove. Irrespective of the action produced by the first and second lances, oxygen can therefore be provided for controlled post-combustion of carbon monoxide in a region adjacent the molten metal and the amount of heat obtained in the post-combustion phase can be supplied directly to the molten metal.

Finally it is advantageous for gas and/or solid materials to be supplied intermittently by way of one or more lances. In that way gas and/or solid materials can be supplied in a controlled fashion in dependence on the nature of the treatment to be carried out or the condition of the molten metal or scrap which is present in the vessel but which has not yet melted.

If the metallurgical vessel is part of an electric arc furnace, then the process according to the invention, as set forth by one or more of the above-mentioned steps, can be used in a particularly advantageous manner. More specifically it is possible in that way very rapidly to build up a sufficiently high layer of foam or granulated slag and thus to shield the arc relative to the walls of the furnace vessel, whereby the level of heat losses is reduced. In addition the consumption of electrical energy an be further perceptibly lowered by the specific supply of fine-grain coals as fuel, which supply can be well controlled in regard to the metering effect thereof.

For carrying out the process according to one or more of the above-mentioned features, it has been found advantageous to use an apparatus in which the first and second lances are connected together in such a way that the outlet openings of the two lances extend inclinedly towards each other at a predeterminable angle. That ensures in a simple fashion that, after tha solid materials issue from the second lance, they are deflected by the gas issuing from the first lance and are specifically supplied with the gas to a region of the molten metal.

Further advantageous embodiments concerning the apparatus are set forth in claims 16 through 20.

Figure 2:
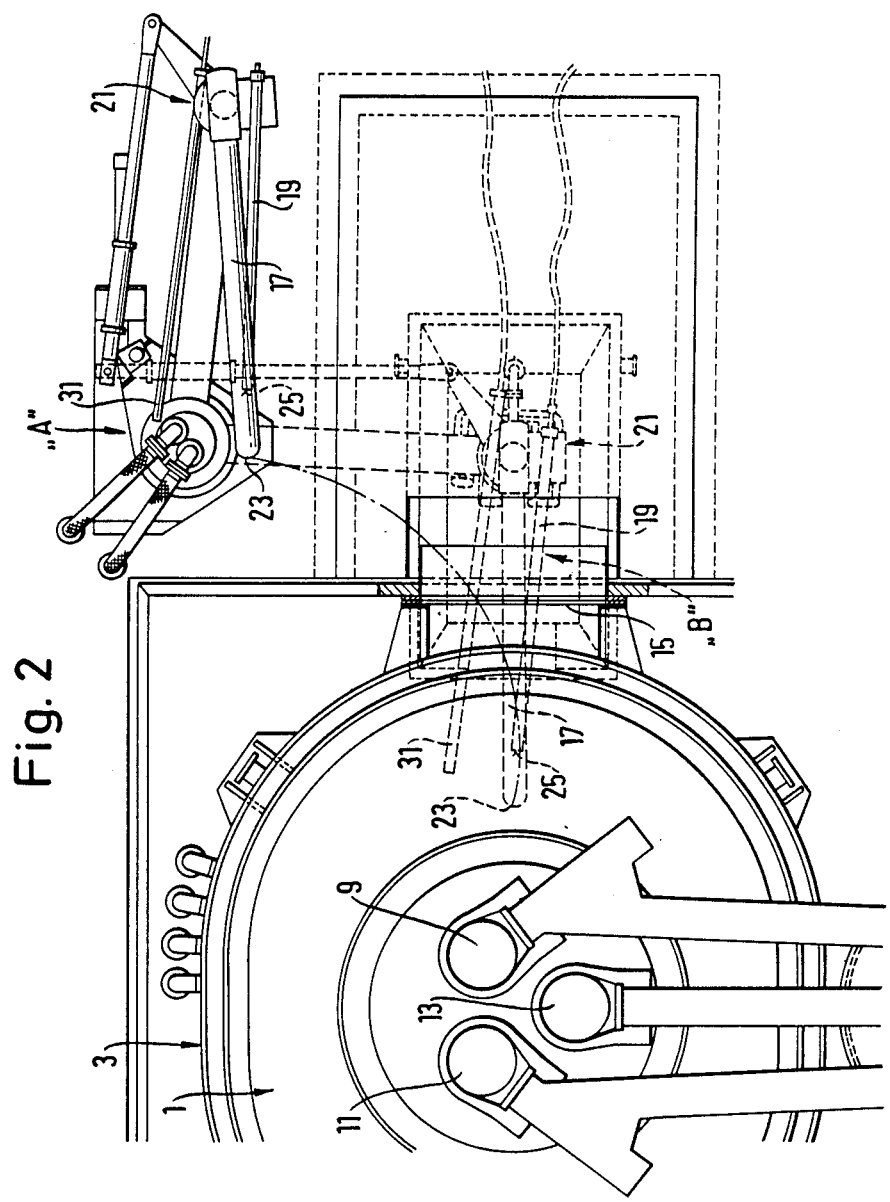

An example of the process according to the invention and an embodiment of an apparatus for carrying out the process are described in further detail with reference to the drawing in which:

FIG. 1 is a partly sectional diagrammatic front view of part of an electric arc furnace with an apparatus according to the invention, and FIG. 2 shows a diagrammatic plan view of part of the electric arc furnace and the apparatus shown in FIG. 1 in its starting and operational position.

An electric arc furnace which is generally identified by reference numeral 1 includes a melting vessel 3 in which there is disposed a molten metal bath 5, on the surface 7 of which is formed a layer of slag which is indicated at 8 but which is not illustrated in greater detail. In the present embodiment, illustrated above the surface 7 are three electrodes 9, 11 and 13 which can be mounted on support arms in a manner which is known and therefore not described, and which can be guided into the interior of the vessel 3 by way of openings in a cover of the vessel.

At its side the vessel 3 has an opening 15 by way of which first and second lances 17 and 19 can be passed into a region within the vessel 3. The two lances 17 and 19 are connected in fixed association with each other to a manipulator which is generally identified by reference numeral 21 and with which they can be moved into and out of the vessel 3 in a manner which is known and which is therefore not described in greater detail herein, and with which they can be pivoted about a vertical axis over a certain region within the vessel 3.

The first and second lances 17 and 19, like a third lance 31 which will be described in greater detail hereinafter, can thus be moved from the starting position which is indicated at 'A' in FIG. 2 and in which they are entirely outside the vessel 3, into the operational position which is indicated by 'B' and in which they project through the opening 15 into the vessel 3.

The two lances 17 and 19 are water-cooled and the first lance 17 which is the upper one and which is disposed substantially in a horizontal plane serves ro supply a gas, for example oxygen. The outlet opening 23 is angled downwardly towards the molten metal 5 at about 45°, relative to the remaining region of the first lance 17. The second lance 19 is substantially straight and is arranged inclinedly relative to the first lance 17 both in the horizontal direction and in the vertical direction so that its outlet opening 25 is disposed substantially in a common vertical plane beneath the outlet opening 23 of the first lance 17. The outlet opening 25 terminates at a spacing in front of the outlet opening 23 so that, when the outlet openings 23 and 25 are fixedly associated with each other, the outlet opening 23 of the first lance 17 always projects further into the vessel 3 than is the case with the outlet opening 25.

The second lance 19 which is of smaller diameter than the first lance 17 serves to feed the molten metal 5 with fine-grain solid materials which are conveyed for example with air or inert gas as a transporting medium and which leave the outlet opening 25 in a condition of being entrained in a conveyor stream 27 which, adjoining the outlet opening 25, substantially maintains its direction, namely the direction of the second lance 19. The conveyor stream 27 extends inclinedly downwardly at about 10° relative to a horizontal plane, with the present arrangement of the second lance 19.

The gas 29 which flows out of the outlet opening 23 leaves the outlet opening substantially while maintaining its direction within the outlet opening 23. That means that the direction of the gas 29 issuing from the outlet opening 23 is such that it impinges on the surface 7 at an inclined angle relative to a vertical line, in a region of the surface 7 which is displaced towards the interior of the vessel 3 in front of the outlet opening 23 or the first and second lances 17 and 19. The geometry of the arrangement of the first and second lances 17 and 19 and the respectively associated outlet openings 23 and 25 therefore results in the gas 29 and the conveyor stream 27 flowing in directions whereby the conveyor stream 27 encounters the gas 29 in a region adjacent the outlet opening 23. Due to the higher velocity of the gas 29 which is produced by a nozzle, for example a Lavel nozzle (not shown) which is arranged at the end of the lance 17, the fine-grain solid materials contained in the conveyor stream 27 are deflected in the direction of the gas 29 and conveyed therewith on to the surface 7 in order to act on the molten metal 5. In that respect the direction of the gas 29 remains substantially unaffected. Only a small part of the transporting medium contained in the conveyor stream 27 is entrained by the gas and can escape predominantly into the region of the vessel 3 which is above the surface 7. That ensures that the transporting medium leaves the chemical reactions between the gas 29 and the solid materials with the molten metal 5 and the slag substantially unaffected.

If, as in the present embodiment, the aim is not only to provide that the gas 29 with the entrained solid material passes throught the layer of slag 8, but also penetrates into the molten metal 5 through the surface 7, then the gas 29 should leave the outlet opening 23 at a speed which is in the supersonic range, for example 2.5 times the speed of sound. The speed of the conveyor stream 27 is substantially lower in comparison therewith and may be for example in the range of from 20 m/s to 50 m/s.

The arrangement of the first and second lances 17 and 19 means that for example oxygen together with carbon as the fine-grain solid material can be supplied to a locally limited region of the molten metal 5 above the surface 7; in that connection, depending on the speed of the gas 29, the layer of slag 8 which has already been formed and the spacing at which the first and second lances 17 and 18 are arranged above the surface 7, the depth of penetration of the material into the molten metal 5 may be up to several centimeters, for example about 5 cm to 8 cm under the above-indicated flow conditions. With a continuous supply of oxygen by way of the first lance 17, carbon can be introduced in a controlled manner as required or in dependence on the condition of the molten metal 5, intermittently by way of the second lance 17, for example to promote formation of the slag or to cause foaming of the slag or as an additional energy carrier.

After the lances 17 and 19 have been directed on to additions of scrap which have not yet been melted or which have not yet been completely melted, specifically supplying carbon can result in the scrap being caused to melt quickly or can result in a cutting burning operation in the scrap being supported by the oxygen which is supplied by way of the first lance 17.

Therefore, besides the molten metal being subjected to the action of a gas 29 and fine-grain solid materials, which can be locally predetermined within the vessel 3, the process according to the invention also makes it possible to provide for metering, in dependence on needs, of supplied fine-grain solid materials, wherein the fact that the solid materials are entrained by the gas guarantees that the solid materials supplied are also supplied to the desired region of the surface 7 or to a region at a lower depth within the molten metal 5, without involving considerable losses due to solid materials moving away into regions of the vessel 3, which are outside the molten metal 5.

For use of the process according to the invention, it has been found to be highly advantageous that dusts such as for example filter dusts which are produced in metallurgical processes can also be supplied as the fine-grain solid materials. Such dusts can be re-used without intermediate treatment so that there is no need for the cost-intensive operation of removing those dusts, which is otherwise conventional practice.

So that a further gas or further solid materials can be supplied independently of the first and second lances 17 and 19, it may be advnatageous for a further third lance 31 to be arranged adjacent the first and second lances 17 and 19. For controlling a metallurgical treatment, it may be advantageous for the third lance 31 to be arranged movably independently of the first and second lances 17 and 19 which are fixedly associated with each other, in such a way that a flow of gas issuing from the third lance 31 is so directed that there is no interactional influencing with the conveyor stream 27 or the gas 29. By virtue of oxygen being injected by way of the third lance 31 into a region which is directly above the surface 7 of the metal 5, the heat energy produced by post-combustion of carbon monoxide can be fed directly to the molten metal.

We claim:

1. A process for subjecting molten metal in a metallurgical vessel having a first lance with a first outlet opening and a second lance with a second outlet opening, to the action of a gas and to fine-grain solid material, comprising the steps of: supplying the gas to said vessel from said first lance with a first velocity conveying said fine-grain solid material into said vessel by a fluid conveyor stream from said second lance with a second velocity lower than said first velocity, in such a way that said material after leaving said second outlet opening is deflected by the gas from said first outlet opening and supplied by said gas to the molten metal.

2. A process as set forth in claim 1, wherein the first velocity is in the supersonic range.

3. A process as set forth in claim 2, wherein the first velocity is about 2.5 times the speed of sound.

4. A process as set forth in claim 1, wherein the second velocity is about 20 m/s to 50 m/s.

5. A process as set forth in claim 1, wherein the gas is oxygen.

6. A process as set forth in claim 1, wherein the solid material is fine-grain carbon.

7. A process as set forth in claim 1, wherein the fine-grain material is selected from the group consisting of slag-forming agents, metallurgical agents, blast-furnace dusts, fine ores, and sintered products thereof.

8. A process as set forth in claim 1, wherein the solid material is of a grain size of about 0.01 mm to 1 mm.

9. A process as set forth in claim 1, comprising the step of supplying at least one of a further gas and a further fine-grain solid material to the metal by way of a third lance.

10. A process as set forth in claim 9, wherein the at least one further material and gas is substantially uninfluenced by the gas issuing from the first lance and the conveyor stream issuing from the second lance.

11. A process as set forth in claim 10, wherein oxygen is supplied by way of the third lance substantially to a region directly above the surface of molten metal in the vessel and within a layer of slag which is disposed above same.

12. A process as set forth in claim 1, wherein the solid material is supplied intermittently.

13. A metallurgical vessel comprising:
 a first lance having a first outlet opening for supplying gas into said vessel,
 a second lance having a second outlet opening for supplying fine-grain solid material into said vessel,
 said lances being arranged such that said outlet openings extend inclinedly at a predetermined angle relative to each other, the first outlet opening being located above the second outlet opening.

14. Apparatus as set forth in claim 13, wherein the first lance has a bent-over end and the second lance is of a substantially straight configuration.

15. Apparatus as set forth in claim 14, comprising a Laval nozzle in the end of the first lance, for producing a supersonic speed in respect of gas passing therethrough.

16. Apparatus as set forth in claim 13, comprising a third lance having a third outlet opening for supplying gas or solid material.

17. Apparatus as set forth in claim 16, wherein the third outlet opening is movable relative to the first and second outlet openings.

18. Apparatus as set forth in claim 13, comprising control means associated with at least one of said lances for controlling the supply so as to be intermittent.

19. Apparatus as set forth in claim 16, comprising control means associated with at least one of said lances for controlling the supply therethrough to be intermittent.

20. Apparatus as set forth in claim 13, comprising a manipulator connected to each of the lances for moving the same.

* * * * *